Feb. 10, 1959 P. E. ASHTON 2,873,030
FILTER
Filed May 4, 1954 4 Sheets-Sheet 1
FIG. 1.
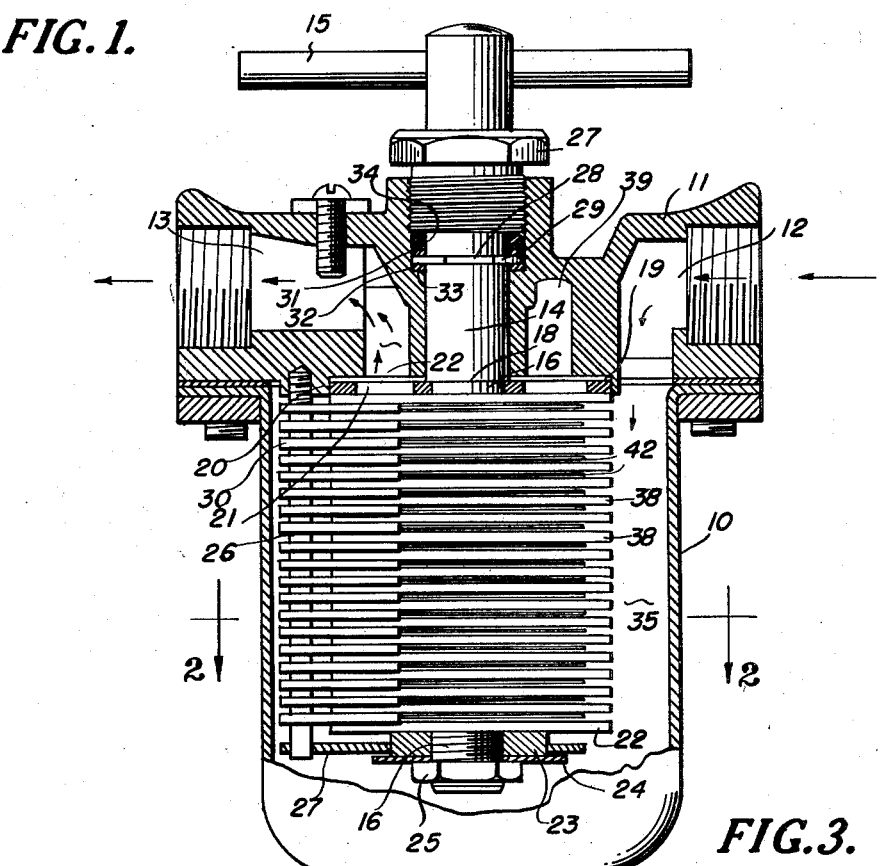
FIG. 2.
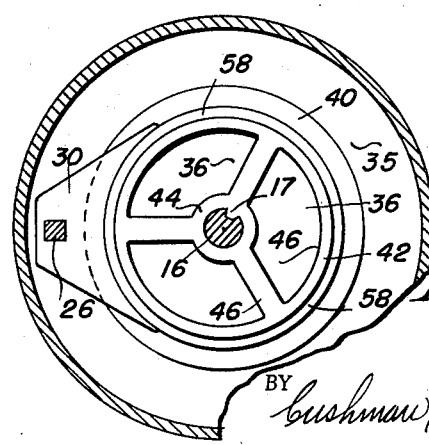
FIG. 3.
INVENTOR
Philip E. Ashton
BY
Cushman, Darby & Cushman
ATTORNEYS Feb. 10, 1959 P. E. ASHTON 2,873,030
FILTER
Filed May 4, 1954 4 Sheets-Sheet 2
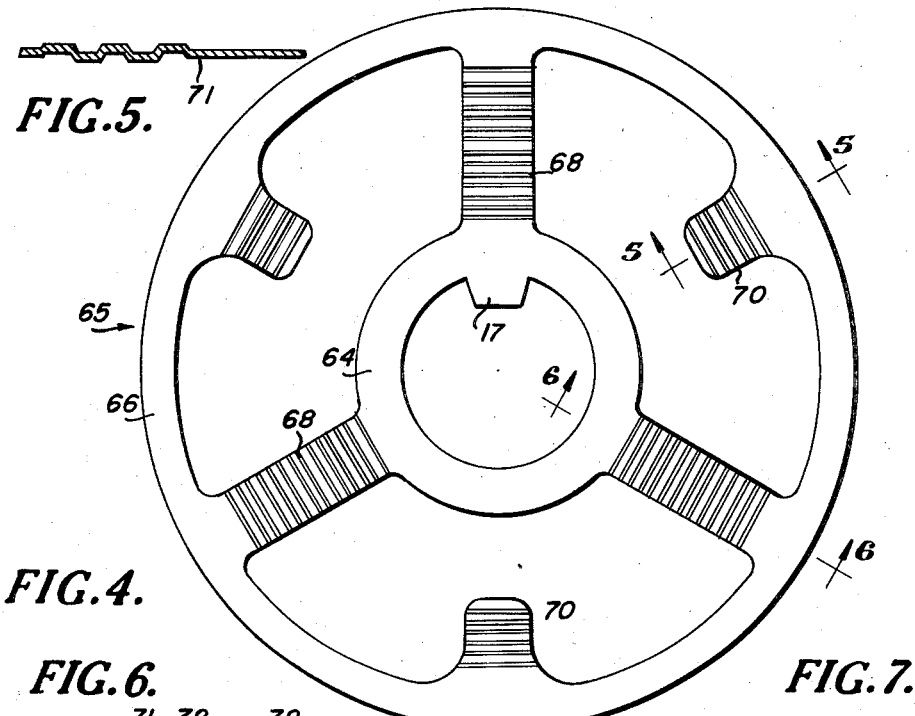
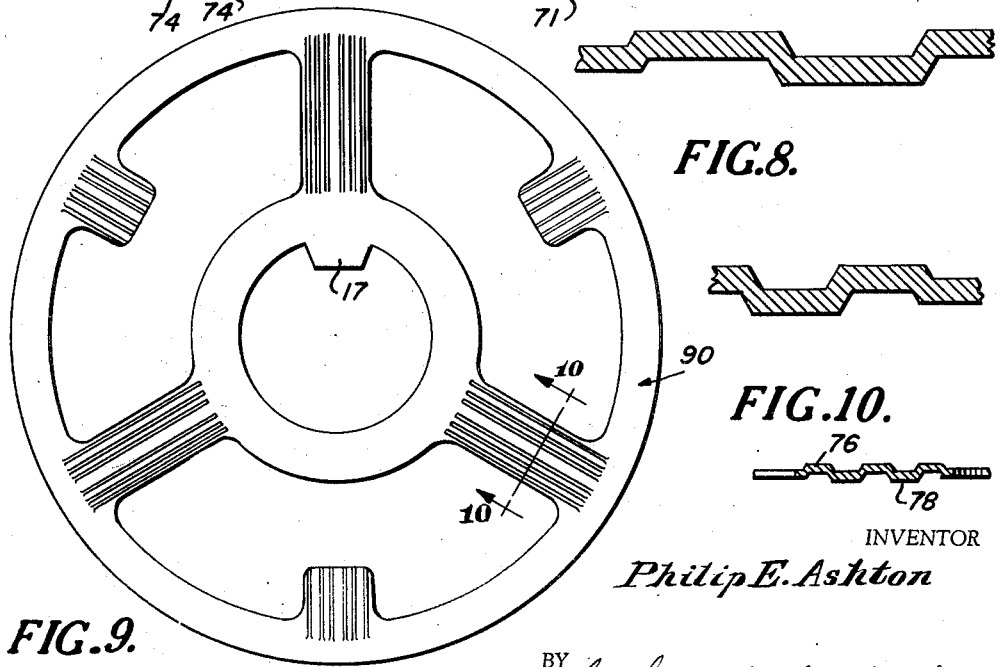
INVENTOR
Philip E. Ashton
BY Cushman, Darby & Cushman
ATTORNEYS Feb. 10, 1959   P. E. ASHTON   2,873,030
FILTER
Filed May 4, 1954   4 Sheets-Sheet 3
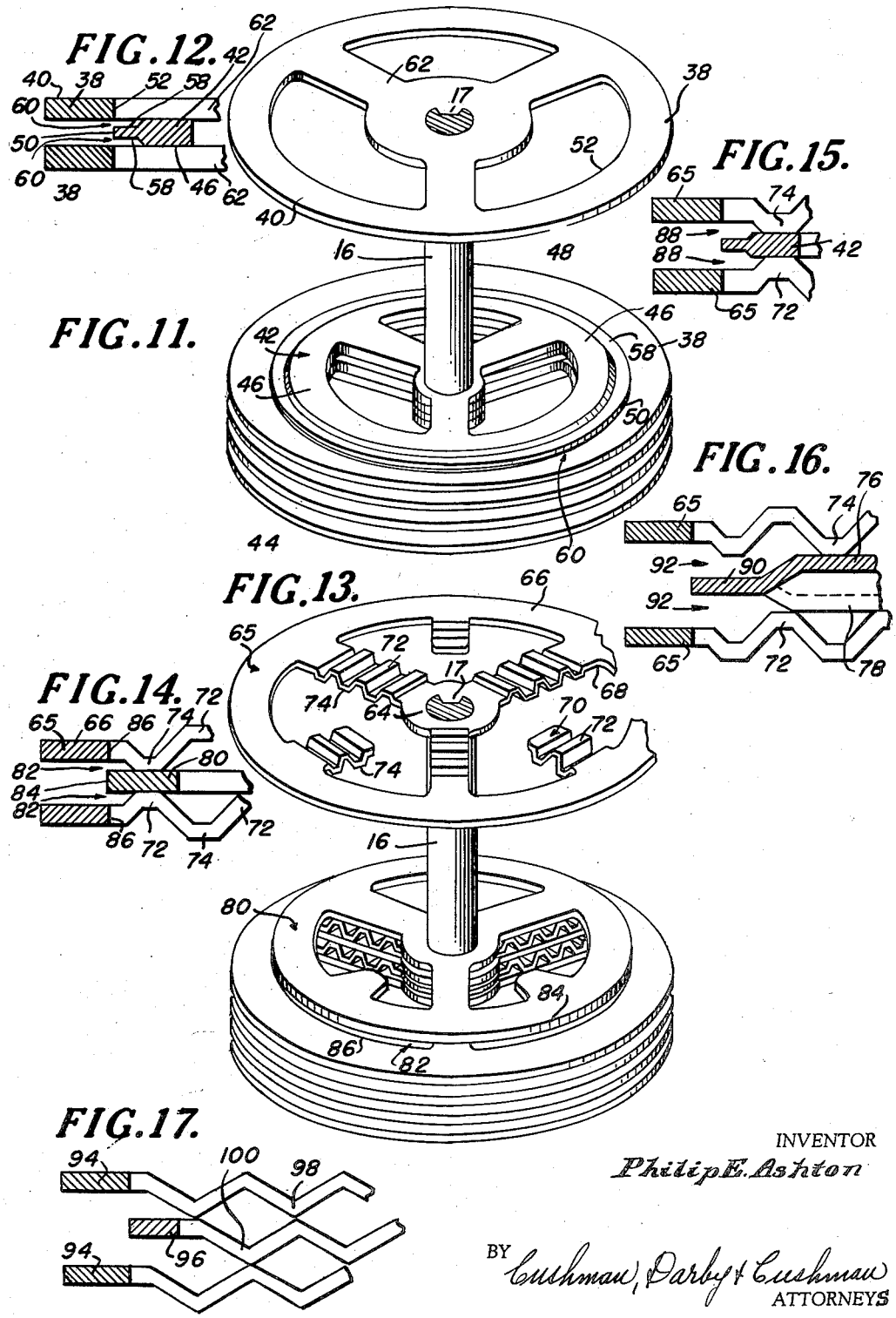
INVENTOR
Philip E. Ashton
BY Cushman, Darby & Cushman
ATTORNEYS Feb. 10, 1959 P. E. ASHTON 2,873,030
FILTER
Filed May 4, 1954 4 Sheets-Sheet 4
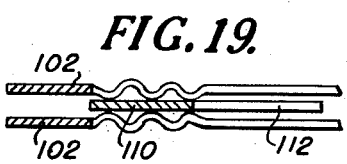
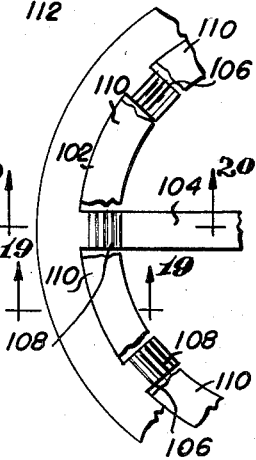
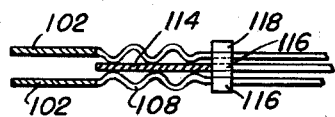
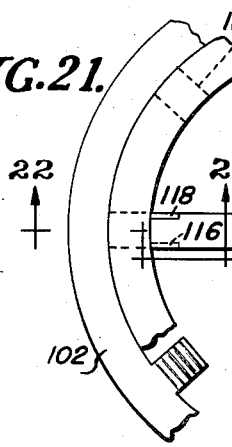
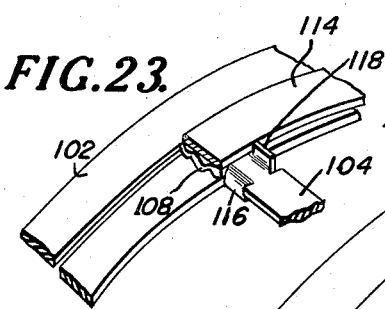
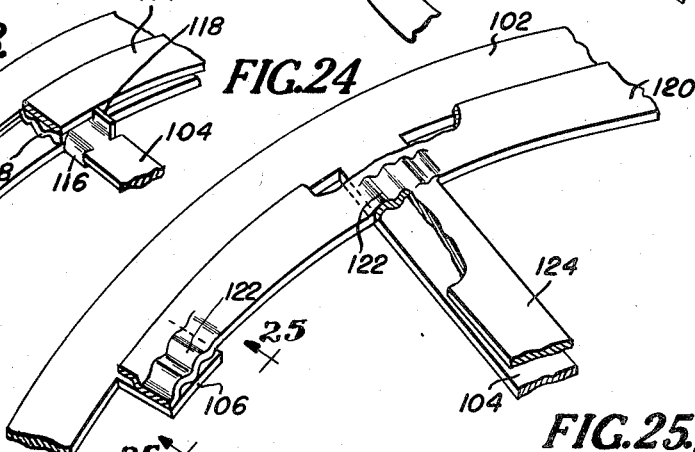
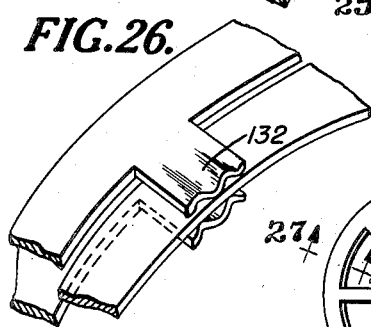
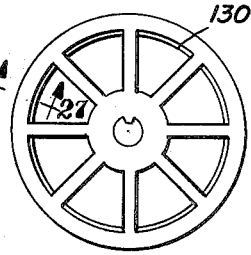
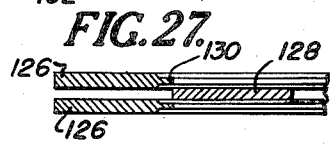
INVENTOR.
Philip E. Ashton
BY Cushman, Darby & Cushman
ATTORNEYS

United States Patent Office 2,873,030
Patented Feb. 10, 1959

2,873,030

FILTER

Philip E. Ashton, Meriden, Conn., assignor to Cuno Engineering Corporation, Meriden, Conn., a corporation of Connecticut Application May 4, 1954, Serial No. 427,416

1 Claim. (Cl. 210—444)

The present invention relates to apparatus for minutely controlling the fine filtration of such liquids as gasoline, oil, paint, varnish, and the like.

The invention is an improvement upon prior art apparatus wherein filtration is accomplished by the passage of the liquid between the perimeter faces of a plurality of relatively thin, flat metal filtering discs which are mounted on a suitable shaft within a casing, the casing having an inlet and an outlet to provide for continuous flow of the liquid to and through the filtering discs.

A principal object of the invention is to improve and simplify that type of filtering apparatus in which the filtration is accomplished by passage of the liquid through circular openings between the discs and which openings have no depth in the direction of flow of the liquid. Such apparatus, and the advantages thereof, are disclosed in British patent specification 486,397 of June 2, 1938, to Societa Anonima Savara.

The invention preferably uses only two types of elements on the support or shaft of the filter. These elements may comprise one type of plain wheel-like form, and another type specially preformed for contact with the plain elements, when the respective elements are arranged alternately on the support or shaft, to establish the amplitude of the filtering openings. The specially preformed elements may be of several standard designs, to vary the amplitude of the filtering opening in accordance with the filtration problem which is presented.

In a variation of the invention, the specially preformed elements may be of two types, with each type manufactured in several standard designs to vary the amplitude of the filtering openings, whereby the type and design of the performed special elements may be selected for use with the plain elements to provide great flexibility in building up filtering cartridges having the desired fineness of the filtering openings to suit the particular filtering problem presented.

From the above, and the detailed description herein, it will be apparent that the invention provides for selective fine filtration with greatly reduced manufacturing costs, by reason of the reduction in the number of component parts, as compared with prior art apparatus, and the ease with which the filtering discs may be handled and assembled, either by the hands of operators or by machines. The invention also provides for the building up of filtration cartridges having minute filtration openings while using only relatively rugged parts in the construction, which parts may be handled with facility. An object of the invention is to completely eliminate in such apparatus, the use of spacers or washers, and to provide for the selective erection of cartridges with exceedingly fine filtration openings between the discs, in a simple manner which would not be practical using the conventional spacers employed in prior art apparatus.

As in the British Savara specification referred to, the filtering openings are formed between the inner edge of the rim of a larger filtering disc, and the outer edge of the rim of a smaller filtering disc, the said discs being alternately arranged on the shaft or support. The inner diameter of the rim of the filtering discs of one set is equal to, slightly smaller or slightly greater than the outer diameter of the rim of the filtering discs of the other set, so that each filtering slot is determined by the distance between the opposed edges of the two successive discs, that is to say, between an inner edge of the rim of a larger disc and an outer edge of the rim of a successive smaller disc, or vice versa. In the apparatus of the said British specification, however, three types of elements are used to form the filtering cartridge, i. e., the two types of filtering discs, and a separate spacer element of star-like construction, and the amplitude or height of the filtering opening is regulated by suitably choosing the ratio between the thickness of a filtering disc and the thickness of the separate spacing element which is disposed within this disc. The present invention is an improvement upon such a construction, in that only two types of elements are used to form the filtering cartridge, and the amplitude of the filtering opening is regulated simply by the design of and choice from standard sizes of specially preformed filtering discs, all of which may be made from stock or sheet metal of one thickness, and which are used alternately with plain discs, likewise made from stock or sheet metal of one thickness, as previously referred to. While the preferred apparatus of the present invention may use only two types of elements in forming the cartridge, much greater flexibility in the selection of the amplitude of the minute filtration openings is provided, all as will be hereinafter apparent, as the specification progresses.

In the drawings:

Figure 1 is a partial vertical sectional view of a conventional filter casing and associated mounting parts, showing one form of the filtering cartridge assembled therein.

Figure 2 is a horizontal sectional view taken on the line 2—2 of Figure 1.

Figure 3 is an enlarged partial vertical sectional view, taken through the rim of one of the specially preformed filtering discs, as described herein.

Figure 4 is a plan view of another type of specially preformed filtering disc, of the larger or major size.

Figure 5 is a partial sectional view taken along the line 5—5 of Figure 4.

Figure 6 is a similar view taken along the line 6—6 of Figure 4.

Figures 7 and 8 are enlarged sectional views, similar to Figure 6, showing how the crimping of the spokes of the filtering discs may vary in size and design.

Figure 9 is a view similar to Figure 4, of another type of filtering disc, of the smaller or minor size.

Figure 10 is a sectional view taken along the line 10—10 of Figure 9.

Figure 11 is a diagrammatic view showing how these filtering discs are mounted on the filtering support.

Figure 12 is a partial vertical sectional view taken through the rims of adjacent filtering discs, of the kind used in the assembly of Figure 11.

Figure 13 is a view similar to Figure 11, showing the use of modified types of filtering discs.

Figure 14 is a view similar to Figure 12, of the rims of the discs which are employed in the assembly of Figure 13.

Figures 15 and 16 are views similar to Figures 12 and 14 of further variations in the assembly of the discs to form filtering cartridges.

Figure 17 is a view similar to Figure 12, of a further modified assembly of the invention.

Figure 18 is a partial top plan view of a major filtering disc of preferred construction.

Figure 19 is a partial vertical sectional view through a pair of the discs of the Figure 18 design, associated with an intermediate plain disc, the section being taken generally along the line 19—19 of Figure 18.

Figure 20 is a view similar to Figure 19, but showing the discs as they would appear in a section taken along the line 20—20 of Figure 18.

Figure 21 is a partial top plan view of a further modified construction, wherein the smaller plain discs are provided without spokes, and held in place by tabs on the spokes of the larger discs.

Figure 22 is a partial vertical sectional view, taken along the line 22—22 of Figure 21.

Figure 23 is a partial perspective view of the discs of the modification of Figures 21 and 22.

Figure 24 is a similar perspective view of a further modification, in which the crimping is provided on the rim of the smaller disc, inwardly from the filtering edge thereof.

Figure 25 is a detailed view, looking outwardly toward the edges of the discs, as same would be viewed in the direction of the arrows 25—25 of Figure 24.

Figure 26 is a partial perspective view, illustrating a variation of the embodiment of Figures 18 through 20, and illustrating that the crimping might be provided extending radially, rather than circularly, on the spokes of the major discs.

Figure 27 is a vertical sectional view, through the edges of adjacent discs, illustrating a further embodiment in which the "coining" is provided on the inner edges of the major discs, between the spokes thereof, this view being taken generally along the line 27—27 of Figure 28.

Figure 28 is a top plan view of one of the major discs, as employed in Figure 27.

It will be understood that the apparatus of the present invention is of the same general organization as the patents to Heftler, No. 1,641,485 and Cuno, No. 1,657,346, but is an improvement upon such prior patents in the simplicity of its construction by reason of the elimination of the spacing elements, and the provision of filtration openings of no depth. The present invention at the same time provides greatly increased flexibility and convenience in the selective variation of the amplitude of the filtration openings in order to meet particular filtration problems.

Referring to Figure 1, it will be understood that the overall construction of the filter casing and mounting for the cartridge may be of any well known or conventional design. The assembly comprises a lower casing 10 secured to a top structure 11, the latter being formed to provide a liquid inlet 12 and an outlet 13. Arranged to depend from the top structure 11, in a manner well known in the art, is a support or shaft 14, which may be turned in the casing by a handle 15, the said shaft having a reduced lower portion 16 (Fig. 2) which is longitudinally grooved to receive the locking tabs 17 on the filtering discs hereinafter described, to prevent the discs from turning with respect to the shaft.

The filtering cartridge is made up from a great number of very thin substantially flat filtering discs stamped from a plain sheet of metal or the like of uniform thickness, which are assembled on and for turning movement with the shaft 14, in a manner well known in the art. Referring to Figure 1, the reduced portion 16 of the shaft 14 forms a downwardly presented shoulder 18, and a thick seal disc 19 is mounted on the reduced portion 16 of the shaft, against the shoulder 18 and spaced from the adjacent lower surface of the top structure or filtering head 11. This disc 19 is referred to as an "inner closer," and its outer periphery fits snugly within a circular machined well or recess 20 in the lower face of the filter head 11, so as to prevent unfiltered fluid from passing to the outlet 13 from the filter head, without traversing the filtering openings between the filtering discs, as hereinafter described. However, the inner closer 19 has openings 21 therein so that filtered fluid may freely flow upwardly therethrough, and to the outlet 13.

The filtering discs are stacked on the reduced portion 16 of the shaft 14 between the inner closer 19 and a lower disc-like plate 22 which is not pierced for passage of fluid, but has only a center hole therein to closely fit around the reduced portion 16 of the shaft 14. The lower end 16 of the shaft is threaded, as shown in Figure 1, and carries a bushing 23 as shown as well as a washer 24 and a securing nut 25. A square rod 26 is threaded into the lower face of the filter head 11, as shown, and carries a plurality of edge scraper blades 30 which may be of conventional design. A plate 27 is attached to the lower end of the square rod 26, and supports the same in proper vertical alignment, the plate 27 having a central circular opening which fits around the bushing 23, thus permitting the filtering cartridge to be turned with the shaft 14, while the plate 27, rod 26 and the scraper elements 30 remain fixed against rotation, the scraping elements thus accomplishing their scraping function, as well known in the art.

It will be understood that when the nut 25 is tightened, the stack of discs may be tightened against one another without transmitting the thrust of this nut against the filter head so as to cause the binding of the stack of discs.

The upper end of the shaft 14 is sealed in the filter head by a gland nut 27. The upper portion of this shaft has a circular groove 28 therein, and a washer 29 of horseshoe shape is fitted in and around this groove, and there are additional circular washers 31 and 32 disposed on opposite sides of the washer 29, the inner washer 32 resting on a shoulder 33 formed in the bore through the filter head which receives the shaft 14. A suitable packing ring 34 is provided above the upper washer 31, and it is engaged by the lower end of the gland nut 27. With this assembly, the horseshoe washer 29 serves as a thrust bearing. Of course, any other conventional means may be employed for mounting the shaft 14 in the bore through the filter head, for turning movement therein, and providing against the escape of fluid.

The general operation of such filtering apparatus is well known in the art. The liquid to be filtered is forced through the inlet 12 and then passes downwardly into the hollow chamber 35 of the filter casing, and thence through the plurality of filtering openings between the filtering discs, into the interior passages 36 of the filtering cartridge. Thereafter, the filtered liquid moves upwardly through these passages and through the openings 21 in the inner closer 19, and into the annular chamber 39 of the filter head 12, after which it then discharges through the outlet 13. When it is desired to clean the filter, the handle 15 is turned, so that the filtering discs mounted on the support or shaft 14 are rotated with respect to the edge scraper blades 30, and these blades thus clean the spaces between the larger filtering discs, as known in the art.

The filtering cartridge is made up of sets of discs of different types, the discs preferably having a central opening through their hubs of design to key them on their support or shaft. In the Figure 1 embodiment, the larger discs 38 are of plain wheel-like construction comprising the central hub and a rim 40 (which is substantially rectangular in cross-section, as shown in Figure 12), the rim and hub being connected by spaced spokes, as is well known in the art.

Between the discs 38, and alternately arranged with respect thereto, are smaller discs 42 which are specially preformed (in the Figure 1 embodiment) to define the longitudinal amplitude of the filtration openings, when assembled on the support 14 with the discs 38. The discs 42 comprise a hub 44, a rim 46, and flat spokes 48 which connect the hub and rim. The exterior diameters of the discs 42 are substantially equal to the interior diameters of the discs 38, as shown in Figure 12, providing outwardly presented edges 50 which are in substantial vertical alignment with the inwardly presented edges 52 of the larger or major discs 38.

It will be understood that both sets of discs are of overall thin flat shape, although the size of same is shown enlarged and distorted in the Figure 12 view, in order to illustrate the novel construction. In general, all of the discs are of substantially the same thickness, and they are arranged on the support 14 as shown in Figure 2, in contact with one another, being held thereon between the top and bottom plates 19 and 22 when a securing nut 25 is tightened.

In order to define the circular filtration openings, the perimeter areas of the discs 42 are reduced in thickness, as shown at 58 in Figure 12. This reduction in thickness is accomplished by any suitable operation, such as a pressing operation, and I refer to the discs 42 as being "coined" at their perimeter areas, to reduce the thickness to the degree desired. By this construction of the smaller or minor discs 42, reduced in thickness as described, circular filtration openings are provided between each of the discs 42, and the adjacent discs 38, of a longitudinal amplitude governed by the degree to which the said perimeter areas are reduced. In Figure 12 the filtration openings are indicated at the termination of the arrows 60.

When the discs 38 and 42 are assembled in alternating relation on the shaft or support, contiguous discs of the different sets or sizes are in contact with one another throughout their hubs and spokes, and the rims 46 of the discs 42 are in contact with the spokes 62 of the larger discs. By reason of the coining of the perimeter area of the disc 42, the outer edges 50 thereof are displaced vertically as at 60 from the edges 52 of the contiguous larger discs 38, to a degree defining the longitudinal amplitude of the filtration opening, as previously referred to.

Figure 4 discloses another type of filtering disc 65 which may be employed, to define the longitudinal amplitude of the filtration opening, as has been referred to. This disc is shown as of the larger or major size. It is similarly made of flat thin metal or the like, having a hub 64, a rim 66 and spaced spokes 68 and 70. As indicated, certain of the spokes 70 extend inwardly from the rim 66, but do not contact or join with the hub 64. Such additional short spokes provide added symmetrically arranged support throughout the cartridge. The spokes 68 and 70 of this type of disc are preformed to define the longitudinal amplitude of the filtration openings, by a suitable pressing operation, which crimps the spokes as shown in Figure 6. In that figure, the flat portion of the spoke which is not deformed is designated 71, and in the deformed zone, projections 72 are provided which extend above the plane of the face of the spoke portion 70, and oppositely or downwardly presented projections 74 are provided which likewise extend beyond the lower plain face of the portion 70 of the spoke. It will be understood that these projections provide a multitude of contact points, with the adjacent or contiguous discs, when the discs are mounted on the support or shaft, and the vertical dimensions of the projections, as viewed in Figure 6, define the amplitude of the filtration openings. The formation of the projections, as described, is referred to herein as a crimping operation and these discs are referred to as "crimped" discs, to distinguish them from the plain discs, or from the "coined" discs as are shown in Figures 2, 3, 11 and 12.

In Figure 4, it will be observed that the crimping is done in a substantially circular direction, i. e., with the ribs or projections 72 and 74, and the grooves therebetween, running in a direction substantially at right angles to the radial axes of the spokes.

Figures 7 and 8 illustrate that there may be a variation in the crimping of the spokes, Figure 7 showing relatively long and widely spaced crimps, while Figure 8 shows relatively short and closely spaced crimping.

In Figures 9 and 10, a modification is shown, wherein the spokes are crimped in a substantially radial direction. Figure 9 shows a disc so formed of the smaller or minor size. It will be understood, and with reference to Figure 10, that the radially extending projections 76 and 78, thus formed, protrude beyond the plane portion of the spokes, as described in connection with Figures 4 and 5, to a degree defining the longitudinal amplitude of the filtration openings.

Figures 13 and 14 illustrate an assembly of plain and specially preformed discs of the kind shown in Figure 4, to form a filter cartridge. The preformed crimped discs are arranged alternately on the shaft or support with plain discs 80 of smaller size. As shown in Figure 14, the crimping projections 72 and 74 of the larger discs, contact the spokes and the rim of the smaller discs 80 at spaced points in order to provide filtration openings 82. The smaller discs are of exterior diameter substantially equal to the interior diameter of the rims 66 of the larger specially preformed discs, and a condition similar as portrayed in Figure 14 results, there being outwardly presented filtration edges 84 on the smaller discs, which are in substantially vertical alignment with the inwardly presented edges 86 of the larger discs.

Referring to Figure 15, another selected arrangement for assembly is shown, in which smaller coined discs 42 are alternately arranged with larger crimped discs 65. In such an arrangement, the longitudinal amplitude of the filtration openings 88 is governed both by the degree of reduction of the perimeter area of the discs 42, and the amplitude of the crimping projections on the discs 65.

Figure 16 illustrates an assembly, in which crimped discs of the larger size as shown in Figure 4, are arranged alternately with crimped discs of the smaller size, as shown in Figure 9, the latter type discs being designated by the numeral 90. In this assembly, the longitudinal amplitude of the filtration openings 92 will be governed by the size of both the projections 72, 74 and 76, 78.

Figure 17 shows another modified assembly, comprising larger discs 94 and smaller discs 96. These discs have the projections on only one side thereof, i. e., there are no projections beyond the flat top faces of these discs, as viewed in Figure 17. However, the spokes are crimped as shown, so that projections are formed extending below the bottom flat faces of the discs, to a degree defining the amplitude of the filtering openings of the cartridge. The projections 98 on the spokes of one disc, are arranged in staggered relation with respect to the projections 100 on the spokes of the other disc, so that the projections contact the adjacent discs, at spaced points which are in the plane of the top face of that adjacent disc, as indicated in Figure 17.

It will be understood that the selected filtration openings, as referred to herein, are very small. As mentioned, it is necessary to show the filtering discs in the drawings, particularly cross-sections thereof, considerably larger than their exact size, in order to bring out the features which are the subject of the invention. For example, a coined disc 42 as shown in Figure 3 may be of thickness of .007", for a given size of filter, and the reduced perimeter area thereof, may be of a thickness of .005", the amount of reduction on each face of the disc at the perimeter area being .001". The outside diameter of this coined disc is about 1.260", and the radial width of the perimeter area of reduced thickness is about .015". This disc would cooperate with plain type larger discs 38 as shown in Figure 11, which would be of an exterior diameter of 1.4" and having an inside diameter of the rim, of substantially the same dimension as the outside diameter of the coined disc 42.

For the same size filter, the major discs 65 of the crimped type, as shown in Figures 5, 13 and 14, would have a thickness throughout of approximately .007", as in the case of the coined disc, and the projections 72 and 74 would extend outwardly from the plane faces of the spokes, on each side, a distance of .003". The outside diameter of such discs 65 would be 1.4" and they would have an inside diameter of 1.257", corresponding with the outside diameter of the smaller type plain discs 80, when employed therewith as shown in Figure 13. The smaller plain discs would be of a thickness of .007".

The same dimensions, as far as thickness is concerned, and amplitude of the projections, would be present in the construction of the crimped minor discs 90, as shown in Figures 9 and 16. For a given size of filter, and when the two types of crimped discs are used together, as shown in Figure 16, the outside diameter of the minor disc would be 1.260" and the outside diameter of the crimped major disc would be 1.4", the inside diameter of the major disc being substantially equal to the outside diameter of the minor disc.

It will be understood filter cartridges of the same general size may be built up, but having filtering openings of minutely differing amplitudes, and over a considerable range of such amplitudes, by selecting the filtering discs from a relatively few types and designs of such discs which would be manufactured and kept on hand. Referring to Figures 12, 14, 15 and 16, it can be seen that great flexibility in the selected amplitude of the filtration opening of a given size cartridge may be provided for while using a relatively few types and designs of discs.

For instance, it is contemplated that two designs of the coined discs of the minor type and three designs of the crimped discs of the major type might be manufactured, along with plain major and minor discs, as shown in Figures 12, 14, 15 and 16. That is, there would be one design of the coin discs preformed to provide filtration openings of .001" and another design of such discs preformed to provide filtration openings of .002". For use with the above, three designs of the major crimped discs would be manufactured with projections which would form filtration openings of .003", .006" and .009", respectively. With these discs, as the standard elements to select from, it would be possible to make up cartridges in each size from these standard parts, having filtration openings varying from one another by .001", throughout the range of .001" to .011". For example, the use of the plain major disc and the two different designs of coined minor discs (Figure 12) would provide filtration openings of .001" or .002". The use of plain minor discs with the three designs of crimped major discs (Figure 14) would provide openings of .003", .006" and .009", as desired. The use of properly selected designs of the crimped and coined discs for use with one another (Figure 15) would provide filtration openings in the sizes .004", .005", .007", .008", .010" and .011".

Accordingly, and to meet particular filtration problems, the degree of fineness of the filtration can be regulated by simply selecting from the standard types and designs of discs in the stocks on hand, there being a wide range of amplitudes for a given size cartridge. This flexibility would not be practical, from the standpoint of manufacture and assembly, using conventional thin washer or spacers to obtain the desired amplitude of the filtration openings. It is well known that the conventional washers of star-like form, used in the prior art, are difficult to manufacture when extreme thinness is required, and such washers or spacers are quite difficult to handle, either by the operator, or by a machine, in assembling the elements of a cartridge. In the practice of the present invention, only elements of substantial body need be manufactured, and the fabrication of fragile spacers in different sizes is avoided. It is possible to provide for filtration openings of less than .001", if desired, using discs as disclosed herein.

Of course, by reason of the design of the filter wherein the filtration openings of depth in the direction of flow are eliminated, it is not necessary to employ slot scrapers extending between the flat faces of the rims of contiguous filtering discs, and only the relatively rugged edge scrapers are required. These edge scrapers may be of any conventional rugged construction and design, for instance, as shown in the Hartman Patent No. 2,227,344 or as shown in Figure 5 of the Fulcher Patent No. 1,975,393. While the filtration openings are extremely fine, as referred to, the edge scrapers employed may be of rugged construction, i. e., of a thickness much greater than the amplitude of the filtering openings, or greater than the edge thickness of the disc which they contact, to thus clean the edge of this disc as well as the opposed flat faces of the two contiguous discs on opposite sides thereof, as disclosed in the said Hartman patent.

While I have disclosed a casing and support assembly for the cartridges, in Figure 1, which contemplates flow of the liquid from the exterior to the interior of the cartridge, it will be understood, as is well known in the art, that the cartridge may be employed with a flow the reverse of that referred to, i. e., from the interior to the exterior of the cartridges. In this case, the inlet and outlet of the casing would be reversed. Similarly, while I have mentioned hand turning of the cartridge for cleaning, it will be understood that the cartridge may be turned by any suitable automatically operating power mechanism, or the cartridge may be continuously turned at a slow speed by power, as is well known in the art.

I have not attempted to show in the drawings all types and designs of the discs which might be employed to practice the invention, nor all possible combinations thereof. Figures 12 through 15 illustrate practical combinations, but other variations and combinations may suggest themselves to those working in the art. For instance, discs of the major size with crimped projections extending radially along the spokes (similar to Figure 9 but with the crimping not extending outwardly beyond the diameter of the inner rim of the disc) might be used with the plain or coined minor discs as in the arrangements of Figures 14 and 15, or, the minor discs 90 of Figure 16 might be used in association with major discs of the plain type. In the trio of discs arranged as in Figure 16, the central disc thereof could be a minor disc of the type shown at 90 in Figure 16, with longitudinal crimps on the spokes thereof, and the contiguous discs of the larger sizes could be plain discs, like the discs 38 shown in Figure 12. In such an arrangement, as in others where plain discs are used, the amplitude of the filtration openings would generally be smaller, than in instances where both major and minor discs are preformed to provide projections on the faces thereof.

In Figures 18 through 20, I show an embodiment which has been found to be preferable from a manufacturing standpoint. The major disc 102 is provided with spokes 104 and false spokes 106, and these spokes are crimped in a circular direction as at 108 adjacent to the rim of the disc. These major discs are alternately arranged on the support, with minor discs 110, as shown in Figures 19 and 20, the minor discs being of the plain design, similar to the minor discs shown in Figure 14, and having spokes 112 aligned with spokes 104 of the major discs, as previously described. The crimping is of wave-like form, rather than having the sharper bends in the crimping, as in the Figure 14 embodiment, and the crimping is confined to areas closely adjacent to the inner edge of the rim of the major disc 102. For instance, as shown in Figure 18, the crimping is provided only throughout the short length of the false spokes 104, and throughout an equal length of the spokes 102, but on the latter, the crimping does not extend to any great distance inwardly along the spoke, the major length of the spoke being of the plain flat construction. The construction, assembly and operation of a cartridge, formed as illustrated in these figures, is otherwise the same as in the previously described embodiments, the amplitude of the wave-like crimping defining the longitudinal amplitude of the filtration openings, and the outer edge of the minor disc being in longitudinal alignment with the inner edge of the major disc, all as previously described.

In Figures 21 and 22, the major discs 102 are generally the same in construction as those shown in the Figure 18-20 embodiment, but minor discs 114 are employed, which discs consist only of rim areas without any spokes or false spokes. This minor disc 114 is held in proper alignment on the support, by tabs 116 and 118 which are bent upwardly and downwardly from the metal of the spokes 104 of the major discs 102. As in the Figure 18-20 embodiment the longitudinal amplitude of the filtration opening is defined by the crimping 108. In the Figure 24 embodiment, the same major discs 102 are employed with their spokes 104 and a further modified type of minor disc 120 is utilized, having wave-like crimping 122 in the rim area thereof, this crimping being spaced inwardly from the outer filtering edge of the minor disc, as is illustrated in Figure 24. This crimping may be provided in the rim of this minor disc, at spaced points, in alignment with its spokes 124 and in alignment with the spokes and false spokes of the major discs 102. As in the Figure 23 embodiment, the spokes of the minor disc 120 (Figure 24) could be omitted, the minor disc being held in position by tabs on the spokes of the major disc, as shown at 116 and 118 in Figure 22. In the latter case, the crimping 122 could be arranged continuously along the inner edge of the minor disc, extending radially as shown, or the convolutions of the crimping could extend circularly in a continuous fashion.

In Figures 27 and 28, a modification similar to that of Figure 12 is illustrated, comprising major discs 126 and minor discs 128, provided with hubs and spokes for assembly on the support, as previously described. In this embodiment, the coining 130, similar to that at 58 in Figure 12, is provided in the inner edges of the major discs 126, between the spokes thereof.

Figure 26 illustrates a possible modification previously referred to, in which radially extending crimping 132 is provided on the spokes and false spokes of the major discs, inwardly of the rim thereof, such major discs being used in association with minor discs of the plain design. Coining of the inner edge of the major discs is of advantage in that any rough edge surfaces due to coining deformation are not exposed to contact with the scraper blades and are on a downstream edge (with respect to the direction of flow of the fluid), and thus are less likely to collect dirt and lint.

With reference to the embodiment of Figure 12, coining of the outer edge of the minor disc may be omitted at spaced points to provide edge support in cases where the minor discs may be slightly greater in outside diameter than the interior diameter of the major discs.

It will be understood that in all of the illustrations herein, where the edges of adjacent discs are shown, no more than three adjacent discs are illustrated, for the sake of simplicity, but the other discs of the same type forming the cartridge would be arranged in alternating relationship, above and below the three discs shown, in an actual construction, as will be understood.

Assemblies of plain and coined discs (as in Figure 12) provide a cartridge with a multitude of minute circular filtration openings without increasing the thickness of the discs and without the use of spacers, whereby a greater number of the minute openings may be provided per given length of cartridge. In addition, this type of cartridge is compact and rugged, with tight contact between discs throughout the areas of the spokes, hub and inner rim portions, and with the finely adjusted perimeter areas protected from contact with other parts, whereby the selected minute amplitude of filtration remains fixed throughout the length of the cartridge.

I claim:

A hollow cartridge for filtration of liquids comprising a central shaft and a plurality of substantially flat discs of major and minor sizes stamped from thin plain sheets of metal of uniform thickness alternately mounted thereon in contact with one another, each of said discs having a rim with opposite flat faces, the exterior diameter of the rim of each disc of minor size being substantially equal to the interior diameter of the rim of each disc of major size, whereby the rims of said discs of major and minor sizes, respectively, have inwardly and outwardly presented filtering edges which are in substantial longitudinal alignment with one another, the mounting of the discs on said shaft being such that there are trios of contiguous discs arranged throughout the length of the cartridge consisting, in each trio, of a major disc and contiguous minor discs arranged on each side of said major disc, each adjacent pair of trios including a common minor disc, the major disc of each trio having a plurality of circumferentially spaced, radially extending spokes, each of said spokes having a crimped portion preformed in its manufacture to provide projections extending outwardly in the direction of the axis of the cartridge to a minute degree on opposite faces thereof, the rim of the minor discs being free of projections on both faces thereof and contacting the projections on the spokes of the associated major discs to thereby define the longitudinal amplitude of the filtering openings between said edges on opposite sides of the major discs.

References Cited in the file of this patent

UNITED STATES PATENTS

| 1,078,674 | Hamill | Nov. 18, 1913 |
| 1,976,547 | Dumas | Oct. 9, 1934 |
| 2,453,622 | English | Nov. 9, 1948 |
| 2,547,941 | Heftler | Apr. 10, 1951 |
| 2,601,521 | Heftler | June 24, 1952 |

FOREIGN PATENTS

| 107,090 | Great Britain | June 21, 1917 |
| 480,810 | Great Britain | Mar. 1, 1938 |
| 486,397 | Great Britain | June 2, 1938 |
| 725,841 | Germany | Oct. 1, 1942 |
| 415,093 | France | July 4, 1910 |